United States Patent [19]
Einhorn et al.

[11] Patent Number: 5,442,764
[45] Date of Patent: Aug. 15, 1995

[54] DIGITAL SIGNAL PROCESSING HAVING IMPROVED EXECUTION EFFICIENCY

[75] Inventors: Kenneth H. J. Einhorn, Austin; Jay D. Stewart, Cedar Park, both of Tex.

[73] Assignee: Texas Instruments Incorporated, Dallas, Tex.

[21] Appl. No.: 570,171

[22] Filed: Aug. 20, 1990

[51] Int. Cl.⁶ ............................................. G06F 9/445
[52] U.S. Cl. .................. 395/700; 364/DIG. 1; 364/DIG. 2; 364/244.8; 364/964.2; 364/964.31; 395/842
[58] Field of Search ........... 395/DIG. 1, DIG 2, 200, 395/425, 600, 650, 700, 800

[56] References Cited

U.S. PATENT DOCUMENTS 4,539,652 9/1985 Rubin .................................. 364/900

OTHER PUBLICATIONS

"TMS 34010 User's Guide.", Users Manual by Texas Instruments (TI) (1986) pp. 5-28 (1 page Section 5, p. 28).

Primary Examiner—Robert B. Harrell
Attorney, Agent, or Firm—Thomas G. Eschweiler; James C. Kesterson; Richard L. Donaldson

[57] ABSTRACT

A digital signal processor (32) having an associated memory (34) executes a program interpreter (40) which interprets program routines stored in a program storage area (42) of the memory (34). The program routines are portions of a larger application program. The program routines are downloaded via control of a CPU (20) which stores a library of program routines in its associated program memory (28).

21 Claims, 2 Drawing Sheets

1

DIGITAL SIGNAL PROCESSING HAVING IMPROVED EXECUTION EFFICIENCY

RELATED APPLICATIONS

This patent application is related to U.S. patent application Ser. No. 569,676, now U.S. Pat. No. 5,136,631, entitled "Method and Apparatus For Programming A Voice Services Systems", by Einhorn et al., filed Aug. 20, 1990, (Attorney Docket No. TI-15390) and U.S. patent application Ser. No. 569,677, now abandoned, entitled "Voice Services System", by Einhorn et al., filed Aug. 20, 1990, (Attorney Docket No. TI-15391).

TECHNICAL FIELD OF THE DISCLOSURE

This invention relates in general to electronic circuits, and particularly to digital signal processor control.

BACKGROUND OF THE DISCLOSURE

Digital signal processing is an important aspect of many electronic systems including acoustics, speech processing, seismology, and other fields. Digital signal processing concerns the manipulation of signals which are represented by sequences of numbers. Often the manipulations of the numerical sequences are extremely complex.

Digital signal processor integrated circuits have been designed to provide the functionality necessary to perform signal processing algorithms. The digital signal processors are similar to a microprocessor in that they execute a program stored in an associated memory. Typically, however, the digital signal processors address a limited memory space and do not have virtual memory capabilities. Therefore, in order to run a large program, the digital signal processor must be placed in an idle state while a portion of the program is loaded into its local memory and a reset signal is supplied at which time the digital signal processor resumes processing. The idle/download/reset procedure is also followed in order to modify a program stored in the DSP's local memory.

This method of altering the program in the DSP's memory has several problems. First, there is a loss of real time response as the microprocessor is idled and new data is downloaded into its memory. Furthermore, the reset of the DSP may cause the DSP to lose register values, and hence, they must be stored in a context memory and reloaded prior to resetting the DSP, which requires additional time. Further, in some DSPs, the reset button will result in a self-test being performed.

Therefore, a need has arisen for a digital signal processor method and apparatus which allows a program associated with a digital signal processor to be change without idling and resetting the processor.

SUMMARY OF THE DISCLOSURE

In accordance with the present invention, a digital signal processing system is disclosed which substantially eliminates the disadvantages associated with the prior art.

The digital processing system of the present invention includes a digital signal processor associated with a first memory. A second memory stores program routines to be executed by the digital signal processor. Interface circuitry is operable to transfer program routines from the first memory to the second memory under control of a processing unit, such that the transfer can be accomplished without placing the digital signal processor in an idle state.

The present invention provides several technical advantages over the prior art. First, the program routines can be transferred to and from the digital signal processor by the processing unit such that a program can be effectively executed by the digital signal processor which is substantially larger than the first memory. The program can be dynamically changed by adjusting the order of program routines which are transferred to the first memory. Further, the routines may be transferred in a pseudo-code format which is independent of a specific implementation.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE DISCLOSURE

The preferred embodiment of the present invention is best understood by referring to FIGS. 1-5 of the drawings, like numerals being used for like and corresponding parts of the various drawings.

Figure 1:
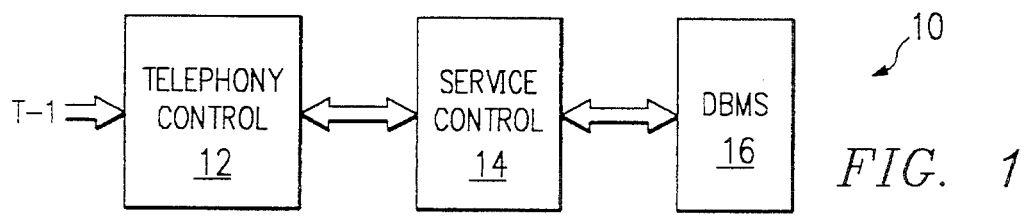
FIG. 1 illustrates a block diagram of a telecommunications system employing the present invention.

FIG. 1 illustrates a block diagram of a telecommunications system. Although the present invention is discussed in connection with the telecommunications of FIG. 1, it is applicable to any digital signal processing system, which will be discussed in greater detail herein.

The telecommunications system 10 comprises a telephony control section 12 connected to a T-1 line and a service control section 14 connected to the telephony control section 12 and a database management system (DBMS) 16.

In operation, the DBMS 16 is a mainframe computer which maintain customer records, billing information, voice data files, and other data requiring a larger database system. The service control section 14 provides the interface between the database management system 16 and the users of the telecommunications system. For example, the service control section 14 would oversee the voice mail system. This would entail retrieving messages from the DBMS 16, prompting the caller for instructions, and so on. The telephony control section 12 interfaces with the T-1 line, performing the actual sending and receiving of voice data to the caller and managing the telecommunications protocols.

Figure 2:
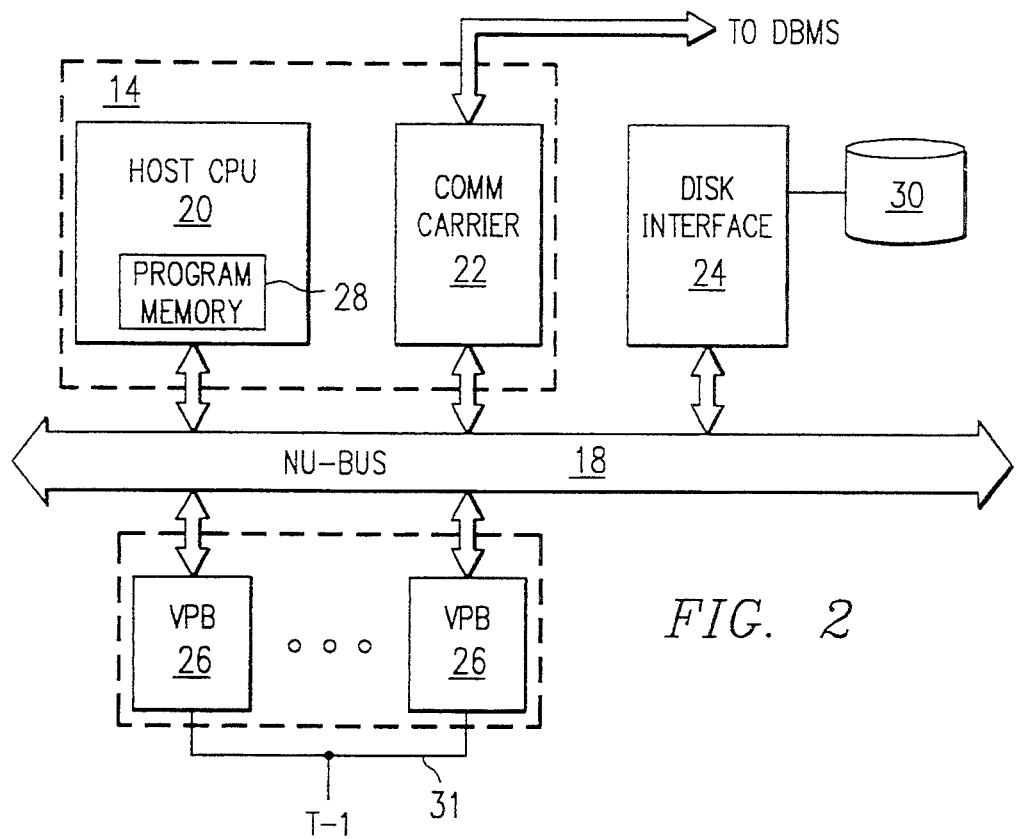
FIG. 2 illustrates a more detailed block diagram of the telecommunications system of FIG. 1.

FIG. 2 illustrates a more detailed block diagram of the telecommunications system 10 of FIG. 1. A bus 18, preferably conforming to the NU-BUS standard, is coupled to a CPU 20, a communications carrier 22, a disk interface 24, and a plurality of voice processing boards (VPB's) 26. The CPU 20 is coupled to a program memory 28. The disk interface is coupled to a hard disk 30, or other mass storage device. The VPBs 26 are also connected to the T-1 line via a T-1 bus 31. The communications carrier 22 is connected to the DBMS 16.

The VPBs 26 comprise the telephony control section 12. Each VPB 26 comprises a plurality of digital signal processors (DSPs), as illustrated in greater detail in connection with FIG. 3. Each VPB board is preferably a multi-tasking system, such that each VPB 26 handles multiple channels on the T-1 line.

The CPU 20 preferably comprises a multiprocessor, for example, the Motorola 68030. The program memory 28 stores program routines and data parameters which are transferred to the VPBs 26 under control of the CPU 20. The CPU 20 also contains a local program memory (not shown) which provides instructions for the microprocessor.

The communications carrier 22 provides the communications functions to transfer information between the bus 18 to the DBMS 16. The disk interface 24 provides an interface between the bus 18 and a mass storage device, such as hard disk 30, primarily used for storing temporary data associated with voice messaging services.

In operation, the CPU 20 transfers program routines and data parameters from the program memory 28 to the VPBs 26. The VPBs 26 execute the program routines downloaded by the CPU 20. When execution of the program routines is complete, the CPU 20 is notified via bus 18, and the CPU may download another program routine.

Each program routine may be thought of as a portion of an application program. By executing only a portion of an application program in the VPB 26, several advantages are evident. First, the program routines allow an execution of an application program which has memory requirements much greater than the local memories contained in the VPBs 26. Second, an application program may be dynamically adjusted during runtime by modifying the order of program routines transferred to the VPBs 26. Third, additional services and features may be added to the system 10 without interrupting its on-going operations.

Figure 3:
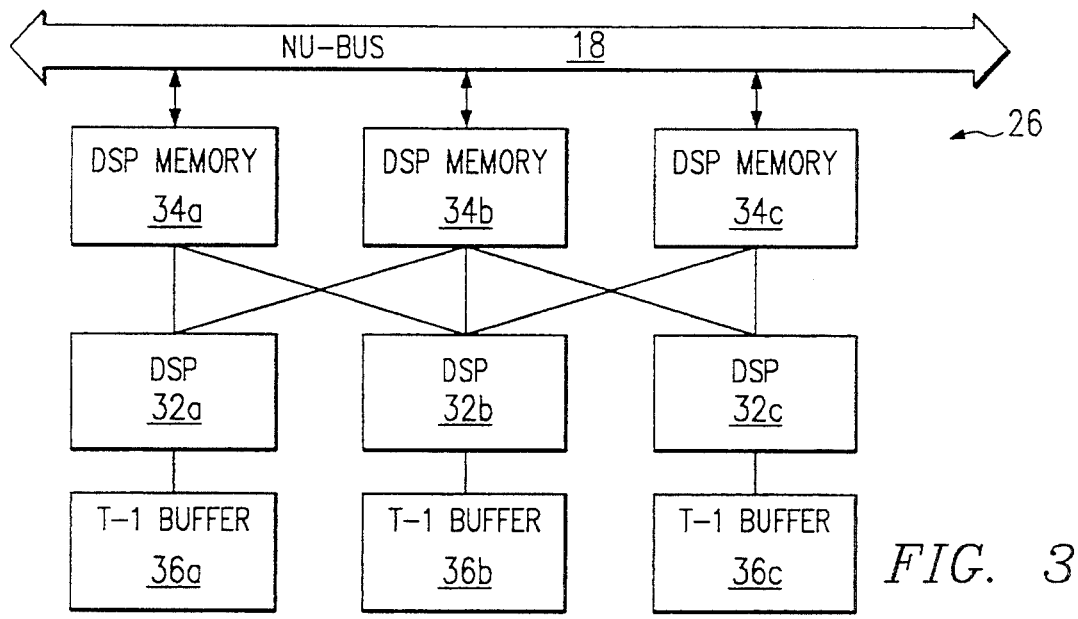
FIG. 3 illustrates a block diagram of the voice processing board of the present invention.

FIG. 3 illustrates a block diagram of a VPB 26. Each VPB 26 comprises a plurality of DSPs 32 (shown individually as DSP 32a–c). Each DSP 32a has a respective DSP memory 34a–c and a respective T-1 buffer 36a–c. The DSP memories 34a–c are cross-coupled between the DSPs 32a–c such that communication between the DSPs is possible. Circuitry for interfacing with the NU-BUS (not shown) may comprise a Texas Instruments TMS 320C25 integrated circuit.

In the preferred embodiment, the DSPs 32 comprise Texas Instruments 320C30 digital signal processors. Each DSP memory 34 comprises a one megabyte memory arranged as 256k×4 bytes (for a 32-bit bus). The T-1 buffer comprises a Mitel MT8920 ST-bus parallel access circuit. The T-1 buffer translates waveforms generated by the DSPs to provide suitable signals to place on a T-1 line. Additional T-1 chips, such as the Mitel MT8980 and MT89760 are necessary to communicate with the T-1 line.

In operation, one DSP 32 is responsible for running the program routines downloaded by the CPU 26. The other DSPs are dedicated to particular functions. For example, one DSP may be dedicated to the speaker independent continuous digit recognition wherein a caller may speak the digits into the telephone receiver rather than enter digits using a keypad. Another dedicated function would be speaker verification wherein the caller is identified and verified through use of a spoken identification code. In speaker verification, the identification code is determined using the speaker independent continuous digit recognition, and a voice template is retrieved from the DBMS 16 corresponding to that identification code. The voice template is then compared to the actual spoken code to determine whether the caller is an authorized user.

While the preferred embodiment shows three DSPs and associated memories and T-1 buffers, more or less could be used depending upon the nature of the device in which the DSPs 32 are utilized.

Figure 4:
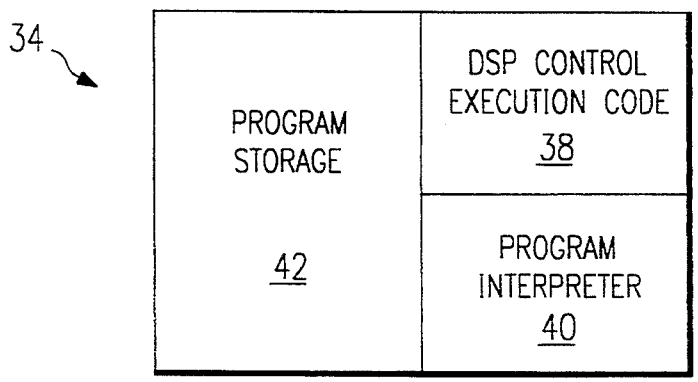
FIG. 4 illustrates the partitioning of the DSP memory.

FIG. 4 illustrates how the DSP memory 34 is used in connection with the DSP which is responsible for executing the program routines transferred by the CPU. The DSP memory 34 may be thought of as having three areas, a DSP control execution code section 38, a program interpreter section 40 and a program storage section 42. The program storage section 42 stores the program routines and parameter data transferred from the CPU 20 to the VPB 26. The program routines are preferably in a pseudo-code form. The program interpreter section 40 contains a code which interprets the pseudo-coded program routines in the program storage section 42. The DSP control execution code section 38 stores code not changed by the CPU 20. This code supports requests from the downloaded software, multitasking, and T-1 and NU-BUS transfer protocols. For example, a pseudo-coded program routine downloaded into the program storage section 42 may contain a function "gen-tone (5)" which indicates a DTMF signal corresponding to keypad digit 5 is desired. The program interpreter interprets the instruction and accesses the appropriate the DSP control code to implement the appropriate DTMF signal.

A digital signal processing system can thus be represented by a digital signal processor (DSP) with a memory associated with the DSP for storing program code to be executed by the DSP, a second memory for storing program routines, interface circuitry operable to allow transfer of program routines between the memory devices, and a processing unit for controlling transfer of program routines between the memory devices without placing the DSP in an idle state.

The actual program language interpreted by the program interpreter will vary depending on the application. For the application of a telecommunication system described hereinabove, the following commands are supported:

ARITHMETIC
  Arithmetic operations: +, −, *, /, mod, = and '−' for unary minus.
  Boolean operations: and, or, xor, not
COMPARISONS
  Comparisons are used in the "if-condition-then-statement" construct to evaluate to TRUE or FALSE. Both string and integer variables can be compared.
  Arithmetic comparisons: =, !=, <, >, <=, >=
  Boolean comparisons: and, or, xor, not, eq.
FUNCTIONS
  ATOI (strexpr): converts a string of digits to its numerical representation.
  CHR (intexpr): returns the ASCII character which corresponds to the number given.
  ITOA (intexpr): converts a number to the string which represents it.

LEN (strexpr): returns the length of the input string.
VAL (strexpr): returns the ASCII value of the first character in the string.

PROCEDURES

The following procedures, mostly relating to telecommunications operations, are supported.

| PROCEDURE | EXPLANATION |
| --- | --- |
| Answer_phone | Prepares the VPB to receive an incoming call and activates the on-hook detection routine once a call has been received. |
| Connect_lines | Connects an incoming and outgoing T-1 channel so the callers on the end of the line can talk to each other. |
| Gen_tone | Generates phone signals on the designated phone line. The signals may be DTMF tones, TOLLMF tones, or special tones such as beeps, warbles, bonds, etc. |
| Monitor | Listen to a phone channel and determine what is heard. |
| Play | Play the contents of a voice file. |
| Recognize | Speaker independent or speaker dependent (or both at the same time) recognition. Template update done on speaker dependent phrases. |
| Record | Record the sounds on the specified T-1 line into a digitized data file. |
| Recv_tone | Activates the task that detects tones on a phone channel. |
| Send_off_hook | Send an off-hook signal on the designated channel. This will accept an incoming call from the network switch. |
| Send_on_hook | This will terminate the use of a T-1 channel. It generates an on-hook signal to the network switch and closes and deallocates the channel from the VPB. |
| Seize | Prepares the VPB to use an output T-1 channel. |
| Sicdr | Performs speaker independent continuous digit recognition. |
| Verify | The subscriber's voice (recorded or live) is verified against the stored template from the subscriber's profile. If the voice verifies successfully, the template will be updated. |
| Wait_off_hook | Waits for an off-hook to occur on the outgoing T-1 channel. The off-hook indicates that the network switch is prepared to receive the card number and the card ID for an outgoing call. once the off-hook has been detected, the on-hook detection routine will be activated. |

Figure 5:
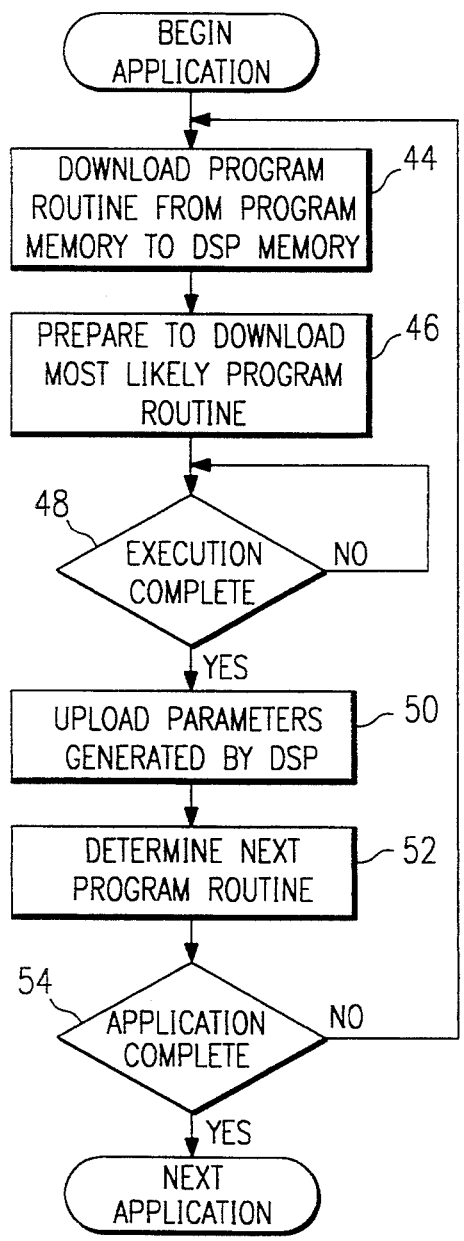
FIG. 5 illustrates a flow chart describing downloading of program routines to the digital signal processors.
Figure 6:
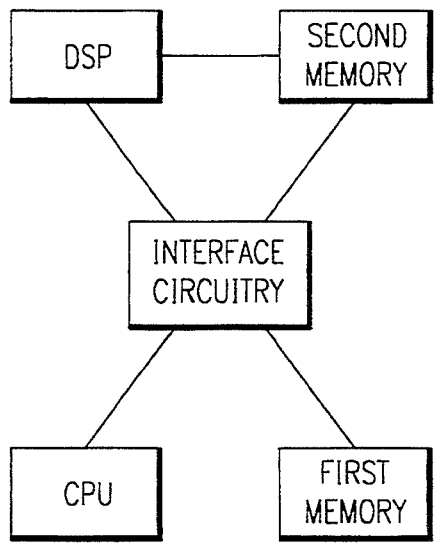
FIG. 6 illustrates a block diagram of a digital signal processing system.

FIG. 5 illustrates a flow chart of the downloading process. In block 44, a program routine is downloaded from the program memory 28 to the DSP memory 34 corresponding to the desired DSP 32*a-c*. After downloading the first program routine, the CPU 20 may determine the most likely program routine to be downloaded next in sequence (block 46). The CPU then waits for the DSP 32 to complete execution of the program routine (decision block 48). Once the execution of the program routine is complete, the CPU uploads parameters generated by DSP (if any) during execution of the program routine (block 50). Based on the uploaded parameters, the CPU 20 determines the next program routine to executed by the DSP (block 52). If the application program has not been completed, the next program routine is downloaded (block 44).

The present invention provides several advantages over the prior art. The application program may be changed dynamically during runtime by the order of transfer of program routines from the program memory 28 to the VPBs 26. Since the CPU 20 transfers program routines and data into an area of the DSP memory 34 which is not executed by the DSP 32, but rather is executed through the DSP's execution of the script interpreter and the control code, an idle/reset routine is unnecessary, which circumvents the problems associated with prior art devices. Further, since pseudo-code is transferred, the code may be transportable to other platforms using different hardware by preparing a suitable script interpreter and control code for the digital signal processor involved.

Although the present invention has been described in detail, it should be understood that various changes, substitutions and alterations can be made herein without departing from the spirit and scope of the invention as defined by the appended claims.

What is claimed is:

1. A digital signal processing system comprising:
a digital signal processor;
a first memory for storing a plurality of program routines;
a second memory for storing program code to be executed by the digital signal processor;
interface circuitry connected to the first memory and the second memory operable to allow transfer of the plurality of program routines from the first memory to the second memory; and
a processing unit for controlling transfer of program routines from the first memory to the second memory, such that the transfer can be accomplished without placing the digital signal processor in an idle state.

2. The digital signal processing system of claim 1 wherein said plurality of program routines are stored in a pseudo-code format.

3. The digital signal processing system of claim 2 and further comprising an interpreter connected to the digital signal processor for interpreting the plurality of pseudo-coded program routines.

4. The digital signal processing system of claim 3 wherein the interpreter is a program stored in said first memory.

5. The digital signal processing system of claim 3 and further comprising control code stored in the second memory connected to digital signal processor for executing predetermined functions.

6. The digital signal processing system of claim 1 wherein the processing unit comprises a microprocessor.

7. The digital signal processing system of claim 1 wherein the interface circuitry comprises a bus.

8. A method of controlling a digital signal processor comprising the steps of:
storing a plurality of program routines defining an application program in a first memory;
transferring the plurality of program routines from said first memory to a second memory connected to the digital signal processor via an interface circuit; and
executing an interpreter program within the digital signal processor which interprets the plurality of program routines, such that the transfer of the plurality of program routines is accomplished without idling the digital signal processor.

9. The method of claim 8 further comprising the step of indicating to a processor when the digital signal processor has completed execution of the program routine.

10. The method of claim 4 and further comprising the step of transferring data from the first memory to the second memory responsive to said indication.

11. The method of claim 10 and further comprising the step of determining a next program routine to transfer from the first memory to the second memory responsive to the data transferred to the second memory.

12. The method of claim 11 and further comprising the step of predicting a program routine which is most likely to be transferred next prior to transferring the data to the second memory.

13. The method of claim 8 wherein said storing step comprises the step of storing the program routines in a pseudo-code format.

14. The method of claim 13 wherein said executing step comprises the step of executing control code stored in the second memory responsive to commands interpreted by the interpreter program.

15. A telecommunications system comprising:
a database management system;
service control circuitry coupled to the database management system operable to receive and transfer data to the database system;
a first memory located within the service control circuitry for storing a plurality of program routines;
a digital signal processor coupled to the service control circuitry;
a second memory for storing the plurality of program routines to be executed by the digital signal processor responsive to the service control circuitry; and
interface circuitry connected to the first memory and the second memory operable to allow transfer of the plurality of program routines from the first memory to the second memory without placing the digital signal processor in an idle state.

16. The digital signal processing system of claim 15 wherein the program routines are stored in a pseudo-code format.

17. The digital signal processing system of claim 16 and further comprising an interpreter connected to the digital signal processor for interpreting the pseudo-coded program routines.

18. The digital signal processing system of claim 17 wherein the interpreter is a program stored in the second memory.

19. The digital signal processing system of claim 17 and further comprising control code within the second memory connected to the digital signal processor for executing predetermined functions.

20. The telecommunications system of claim 15 wherein the service control circuitry comprises a microprocessor and a third memory connected to the microprocessor.

21. The telecommunications system of claim 20 wherein the service control circuitry further comprises communications circuitry for communicating with the database management system.

* * * * *